(12) United States Patent
Matúšů et al.

(10) Patent No.: US 9,909,280 B2
(45) Date of Patent: Mar. 6, 2018

(54) MECHANICAL LINKAGE FOR CONTROL OF POWER MACHINE

(71) Applicant: CLARK EQUIPMENT COMPANY, West Fargo, ND (US)

(72) Inventors: Jakub Matúšů, Odry (CZ); Karel Vaněk, Mníšek pod Brdy (CZ); Petr Kratochvíl, Příbram (CZ); Jaroslav Fišer, Příbram (CZ)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 2 days.

(21) Appl. No.: 14/926,166

(22) Filed: Oct. 29, 2015

(65) Prior Publication Data

US 2016/0122978 A1    May 5, 2016

Related U.S. Application Data

(60) Provisional application No. 62/072,178, filed on Oct. 29, 2014.

(51) Int. Cl.
*E02F 9/20* (2006.01)
*B66C 13/56* (2006.01)
(Continued)

(52) U.S. Cl.
CPC .......... *E02F 9/2004* (2013.01); *B62D 11/006* (2013.01); *B66C 13/56* (2013.01);
(Continued)

(58) Field of Classification Search
CPC ........ B26D 11/006; B66C 13/56; G05G 1/01; G05G 1/36; G05G 1/30; G05G 1/46; Y10T 74/20528; Y10T 74/20189
(Continued)

(56) References Cited

U.S. PATENT DOCUMENTS 2,356,517 A    8/1944  Hale
2,928,293 A    3/1960  Rockwell
(Continued)

FOREIGN PATENT DOCUMENTS

CN    103626036    3/2014
EP    0059219      9/1982
JP    S6150160     4/1986

OTHER PUBLICATIONS

Search Report of the International Searching Authority for Application No. PCT/US2015/057957 dated Feb. 15, 2016 (7 pages).
(Continued)

*Primary Examiner* — Anna M Momper
*Assistant Examiner* — Ronald P Jarrett
(74) *Attorney, Agent, or Firm* — Michael Best & Friedrich LLP

(57) ABSTRACT

A mechanical linkage for a power machine includes first and second horizontal shafts extending sideways along respective first and second axes. First and second links are operably coupled to the respective first and second horizontal shafts. The links convert actuation of operator input devices of the power machine into rotation of the horizontal shafts about their axes. First and second valve actuators convert rotation of the respective first and second horizontal shafts into actuation of respective first and second spools in a hydraulic valve of the power machine.

19 Claims, 6 Drawing Sheets

(51) Int. Cl.
   *G05G 1/01*   (2008.04)
   *G05G 1/36*   (2008.04)
   *G05G 13/02*  (2006.01)
   *B62D 11/00*  (2006.01)
(52) U.S. Cl.
   CPC ............. *G05G 1/01* (2013.01); *G05G 1/36* (2013.01); *G05G 13/02* (2013.01)
(58) Field of Classification Search
   USPC .............. 414/685; 74/473.16, 473.17, 473.2, 74/490.07, 471 R, 512; 251/87, 279; 137/616.3, 616.5
   See application file for complete search history.

(56) References Cited

U.S. PATENT DOCUMENTS

| | | |
|---|---|---|
| 3,631,762 A | 1/1972 | Fuzzell |
| 3,769,852 A | 11/1973 | Peifer et al. |
| 3,995,510 A * | 12/1976 | Yost ................ B60K 23/00 180/335 |
| 4,064,769 A | 12/1977 | Amdall et al. |
| 4,294,465 A | 10/1981 | Simmons |
| 5,553,992 A | 9/1996 | Ashcroft |
| 5,927,153 A | 7/1999 | Bhangoo et al. |
| 6,526,846 B1 | 3/2003 | Duppong et al. |
| 6,655,229 B2 | 12/2003 | Yamamoto et al. |
| 7,017,442 B2 | 3/2006 | Bohm |
| 2007/0131292 A1 * | 6/2007 | Osburn ............ B66C 13/56 137/636.2 |
| 2011/0168283 A1 | 7/2011 | Sakamoto |
| 2012/0279340 A1 | 11/2012 | Davis |

OTHER PUBLICATIONS

Written Opinion of the International Searching Authority for Application No. PCT/US2015/057957 dated Feb. 15, 2016 (8 pages).

* cited by examiner

MECHANICAL LINKAGE FOR CONTROL OF POWER MACHINE

CROSS-REFERENCE TO RELATED APPLICATIONS

This application claims priority to U.S. Provisional Patent Application No. 62/072,178 filed Oct. 29, 2014, the entire contents of which are incorporated herein by reference.

BACKGROUND

This disclosure is directed toward power machines. More particularly, this disclosure is directed toward a mechanical linkage between operator input devices and a hydraulic control valve of a power machine. For example, the mechanical linkage may be on an excavator and the control valve may control various functions on the machine, including drive and steering, work elements, and the like.

Power machines, for the purposes of this disclosure, include any type of machine that generates power for the purpose of accomplishing a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include excavators, loaders, utility vehicles, tractors, and trenchers, to name a few examples.

Prior art linkages between operator input devices (e.g., joysticks, control levers, foot pedals) and a hydraulic control valve include hydraulic conduits, cables, electrical wires, and mechanical linkages.

The discussion above is merely provided for general background information and is not intended to be used as an aid in determining the scope of the claimed subject matter.

SUMMARY

In one embodiment, the invention provides a mechanical linkage for a power machine. The linkage includes first and second horizontal shafts extending sideways along respective first and second axes. First and second links are operably coupled to the respective first and second horizontal shafts. The links convert actuation of operator input devices of the power machine into rotation of the horizontal shafts about their axes. First and second valve actuators convert rotation of the respective first and second horizontal shafts into actuation of respective first and second spools in a hydraulic valve of the power machine.

In another embodiment the invention provides a power machine that includes operator input devices and a hydraulic valve. The power machine further includes the above-described mechanical linkage for causing actuation of spools in the hydraulic valve in response to actuation of the operator input devices.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Figure 2:
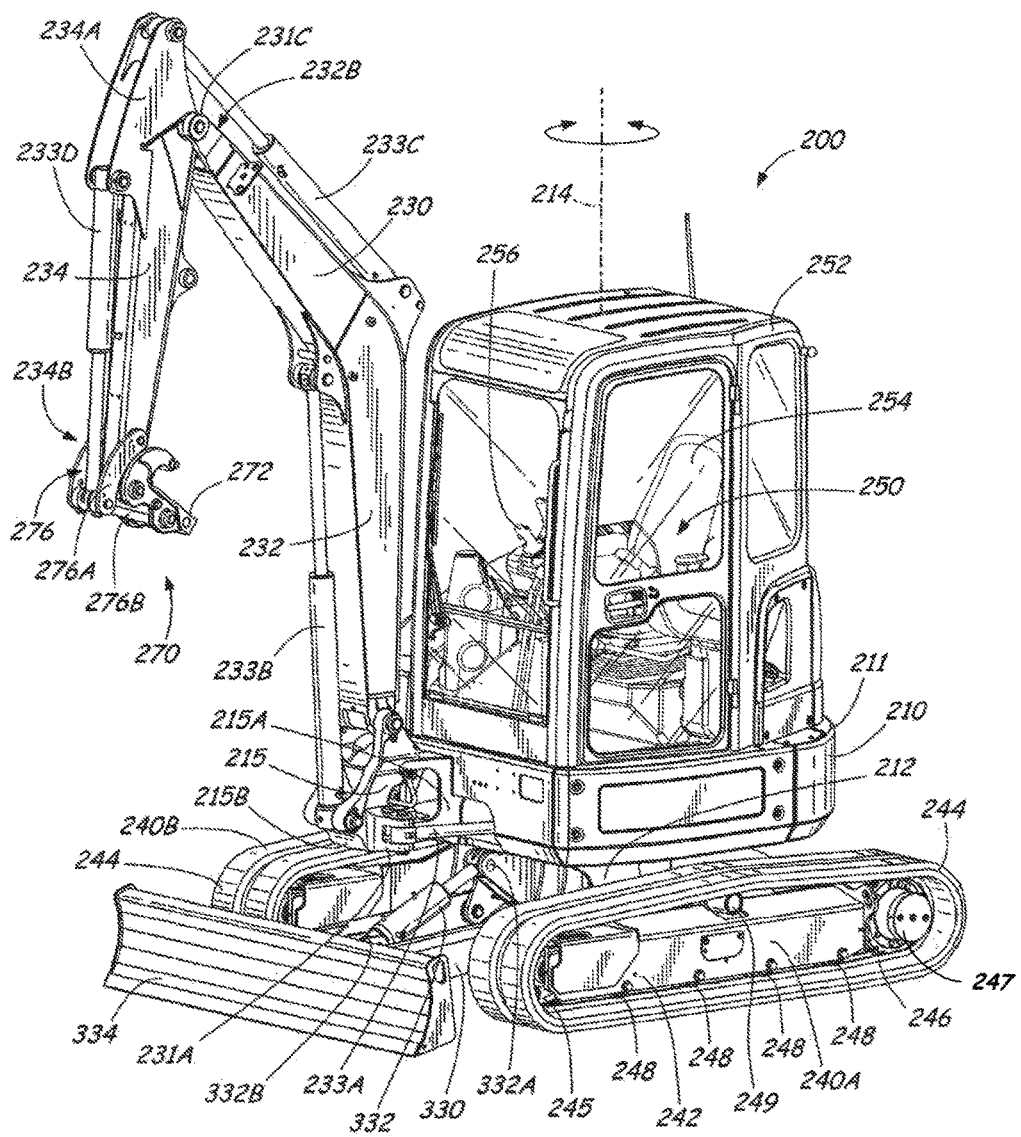
FIG. 2 is a front left perspective view of a representative power machine in the form of an excavator on which the disclosed embodiments can be practiced.
Figure 3:
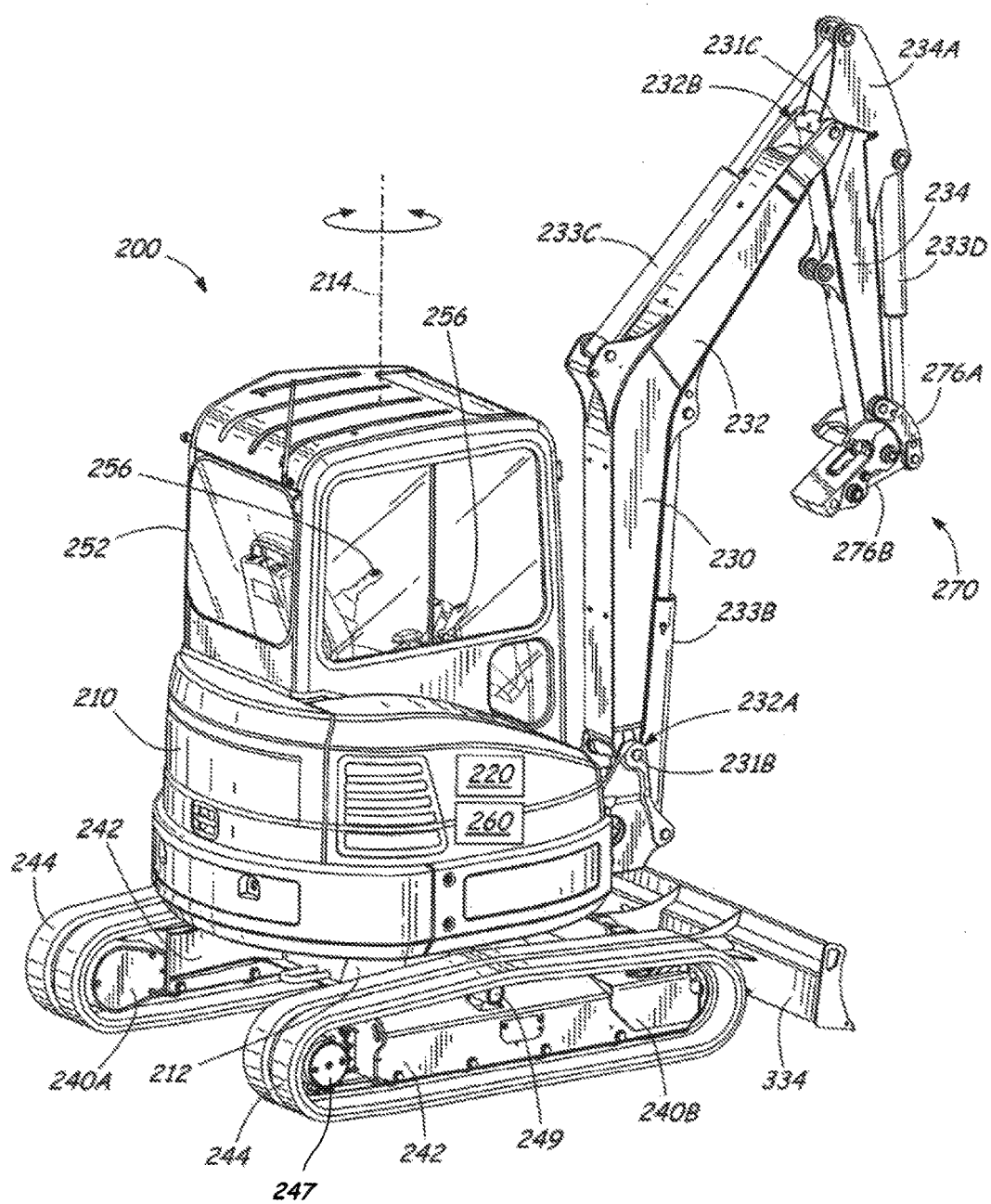
FIG. 3 is a rear right perspective view of the excavator of FIG. 2.

The present invention relates to a mechanical linkage between operator input devices and a hydraulic control valve of a power machine. For example, the mechanical linkage may be on an excavator and the control valve may control various functions on the machine, including drive and steering, house offset, and auxiliary flow control. These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is discussed. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
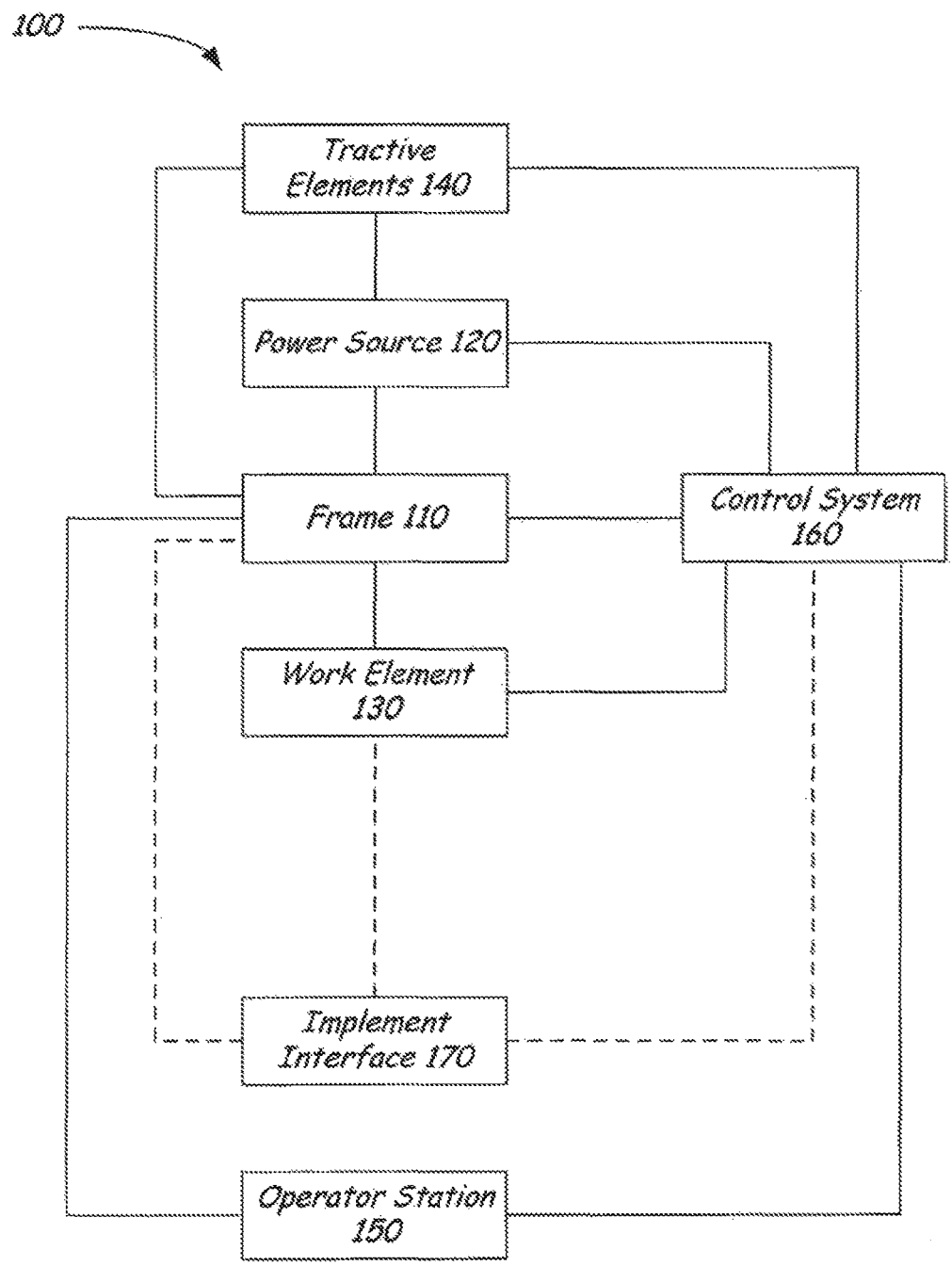
FIG. 1 is a block diagram illustrating functional systems of a representative power machine on which embodiments of the present disclosure can be practiced.

Referring now to FIG. 1, a block diagram illustrates the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a work element in the form of a lift arm to which an implement such as a bucket is attached such as by a pinning arrangement. The work element, can be manipulated to position the implement for the purpose of performing the task. In some instances, the implement can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is capable of providing power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that are capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, wheels attached to an axle, track assemblies, and the like. Tractive elements can be rigidly mounted to the frame such that movement of the tractive element is limited to rotation about an axle or steerably mounted to the frame to accomplish steering by pivoting the tractive element with respect to the frame.

The operator station 150 provides a position from which an operator can control operation of the power machine 100. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote control device can be provided (i.e. remote from both of the power machine and any implement to which is it coupled) that is capable of controlling at least some of the operator controlled functions on the power machine.

FIGS. 2-3 illustrate an excavator 200, which is one particular example of a power machine of the type illustrated in FIG. 1 on which the disclosed embodiments can be employed. Unless specifically noted otherwise, embodiments disclosed below can be practiced on a variety of power machines, with the excavator 200 being only one of those power machines. Excavator 200 is described below for illustrative purposes. Not every excavator or power machine on which the illustrative embodiments can be practiced need have all of the features or be limited to the features that excavator 200 has. Excavator 200 has a frame 210 that supports and encloses a power system 220 (represented in FIGS. 2-3 as a block, as the actual power system is enclosed within the frame 210). The power system 220 includes an engine and a hydraulic system. The engine provides a power output to the hydraulic system, which as a power conversion system. The hydraulic system of excavator 200 includes one or more hydraulic pumps for selectively providing pressurized hydraulic fluid to actuators that are operably coupled to work elements in response to signals provided by operator input devices. The hydraulic system also includes a control valve system that selectively provides pressurized hydraulic fluid to actuators in response to signals provided by operator input devices. The excavator 200 includes a plurality of work elements in the form of a first lift arm structure 230 and a second lift arm structure 330 (not all excavators have a second lift arm structure). In addition, excavator 200, being a work vehicle, includes a pair of tractive elements in the form of left and right track assemblies 240A and 240B, which are disposed on opposing sides of the frame 210.

An operator compartment 250 is defined in part by a cab 252 that is mounted on the frame 210. The cab 252 shown on excavator 200 is an enclosed structure, but other operator compartments need not be enclosed. For example, some excavators have an operator compartment with canopy that provides a roof but does not provide a fully enclosed operator compartment. A control system, shown as block 260, is provided for controlling the various work elements. Control system 260 includes operator input devices, which interact with the power system 220 to selectively provide power signals to actuators to control work functions on the excavator 200.

Frame 210 includes an upper frame portion or house 211 that is pivotally mounted on a lower frame portion or undercarriage 212 via a swivel joint. The swivel joint includes a bearing, a ring gear, and a slew motor with a pinion gear (not pictured) that engages the ring gear to swivel the machine. The slew motor receives a power signal from the control system 260 to rotate the house 211 with respect to the undercarriage 212. House 211 is capable of unlimited rotation about a swivel axis 214 under power with respect to the undercarriage 212 in response to manipulation of an input device by an operator. Hydraulic conduits are fed through the swivel joint via a hydraulic swivel to provide pressurized hydraulic fluid to the tractive elements and one or more work elements such as lift arm 330 that are operably coupled to the undercarriage 212.

The first lift arm structure 230 is mounted to the house 211 via a swing mount 215. (Some excavators do not have a swing mount of the type described here.) The first lift arm structure 230 is a boom-arm lift arm of the type that is generally employed on excavators although certain features of this lift arm structure may be unique to the lift arm illustrated in FIGS. 2-3. The swing mount 215 includes a frame portion 215A and a lift arm portion 215B that is rotationally mounted to the frame portion 215A at a mounting frame pivot 231A. A swing actuator 233A is coupled to the house 211 and the lift arm portion 215B of the mount. Actuation of the swing actuator 233A causes the lift arm structure 230 to pivot or swing about an axis that extends longitudinally through the mounting frame pivot 231A.

The first lift arm structure 230 includes a first portion, known generally as a boom 232 and a second portion, known as an arm or a dipper 234. The boom 232 is pivotally attached on a first end 232A to mount 215 at boom pivot mount 231B. A boom actuator 233B is attached to the mount 215 and the boom 232. Actuation of the boom actuator 233B causes the boom 232 to pivot about the boom pivot mount 231B, which effectively causes a second end 232B of the boom to be raised and lowered with respect to the house 211. A first end 234A of the arm 234 is pivotally attached to the second end 232B of the boom 232 at an arm mount pivot 231C. An arm actuator 233C is attached to the boom 232 and the arm 234. Actuation of the arm actuator 233C causes the arm to pivot about the arm mount pivot 231C. Each of the swing actuator 233A, the boom actuator 233B, and the arm actuator 233C can be independently controlled in response to control signals from operator input devices.

An exemplary implement interface 270 is provided at a second end 234B of the arm 234. The implement interface 270 includes an implement carrier 272 that is capable of accepting and securing a variety of different implements to the lift arm 230. Such implements have a machine interface that is configured to be engaged with the implement carrier 272. The implement carrier 272 is pivotally mounted to the second end 234B of the arm 234. An implement carrier actuator 233D is operably coupled to the arm 234 and a linkage assembly 276. The linkage assembly includes a first link 276A and a second link 276B. The first link 276A is pivotally mounted to the arm 234 and the implement carrier actuator 233D. The second link 276B is pivotally mounted to the implement carrier 272 and the first link 276A. The linkage assembly 276 is provided to allow the implement carrier 272 to pivot about the arm 234 when the implement carrier actuator 233D is actuated.

The implement interface 270 also includes an implement power source (not shown in FIGS. 2-3) available for connection to an implement on the lift arm structure 230. The implement power source includes pressurized hydraulic fluid port to which an implement can be coupled. The pressurized hydraulic fluid port selectively provides pressurized hydraulic fluid for powering one or more functions or actuators on an implement. The implement power source can also include an electrical power source for powering electrical actuators and/or an electronic controller on an implement, but the specific implement power source on excavator 200 does not include an electrical power source. Such an electrical power source can also include electrical conduits that are in communication with a data bus on an excavator to allow communication between a controller on an implement and electronic devices on the excavator.

The lower frame 212 supports and has attached to it a pair of tractive elements 240, identified in FIGS. 2-3 as left track drive assembly 240A and right track drive assembly 240B. Each of the tractive elements 240 has a track frame 242 that is coupled to the lower frame 212. The track frame 242 supports and is surrounded by an endless track 244, which rotates under power to propel the excavator 200 over a support surface. Various elements are coupled to or otherwise supported by the track frame 242 for engaging and supporting the track 244 and causing it to rotate about the track frame. For example, a sprocket 246 is supported by the track frame 242 and engages the endless track 244 to cause the endless track to rotate about the track frame 242 in response to torque received from a hydraulic motor 247. An idler 245 is held against the track 244 by a tensioner (not shown) to maintain proper tension on the track. The track frame 242 also supports a plurality of rollers 248, which engage the track and, through the track, the support surface to support and distribute the weight of the excavator 200. An upper track guide 249 is provided for providing tension on track 244 and prevent the track from rubbing on track frame 242.

A second or lower lift arm 330 is pivotally attached to the lower frame 212. A lower lift arm actuator 332 is pivotally coupled to the lower frame 212 at a first end 332A and to the lower lift arm 330 at a second end 332B. The lower lift arm 330 is configured to carry a lower implement 334. The lower implement 334 can be rigidly fixed to the lower lift arm 330 such that it is integral to the lift arm. Alternatively, the lower implement can be pivotally attached to the lower lift arm via an implement interface, which in some embodiments can include an implement carrier of the type described above. Lower lift arms with implement interfaces can accept and secure various different types of implements thereto. Actuation of the lower lift arm actuator 332, in response to operator input, causes the lower lift arm 330 to pivot with respect to the lower frame 212, thereby raising and lowering the lower implement 334.

Upper frame portion 211 supports cab 252, which defines, at least in part, operator compartment or station 250. A seat 254 is provided within cab 252 in which an operator can be seated while operating the excavator. While sitting in the seat 254, an operator will have access to a plurality of operator input devices 256 that the operator can manipulate to control various work functions, such as manipulating the lift arm 230, the lower lift arm 330, the traction system 240, pivoting the frame portion 211, the tractive elements 240, and so forth.

Excavator 200 provides a variety of different operator input devices 256 to control various functions, including controlling movement of the lift arm 230 as well as the travel functions. Various types of operator inputs can be used in excavator 200 and other excavators and power machines including switches, buttons, knobs, levers, variable sliders and the like. In the embodiments discussed below specific operator input devices and control mechanisms are discussed in detail.

Display devices are provided in the cab to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided.

The description of power machine 100 and excavator 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on an excavator such as excavator 200, unless otherwise noted, the concepts discussed below are not intended to be limited in their application to the environments specifically described above.

Figure 4:
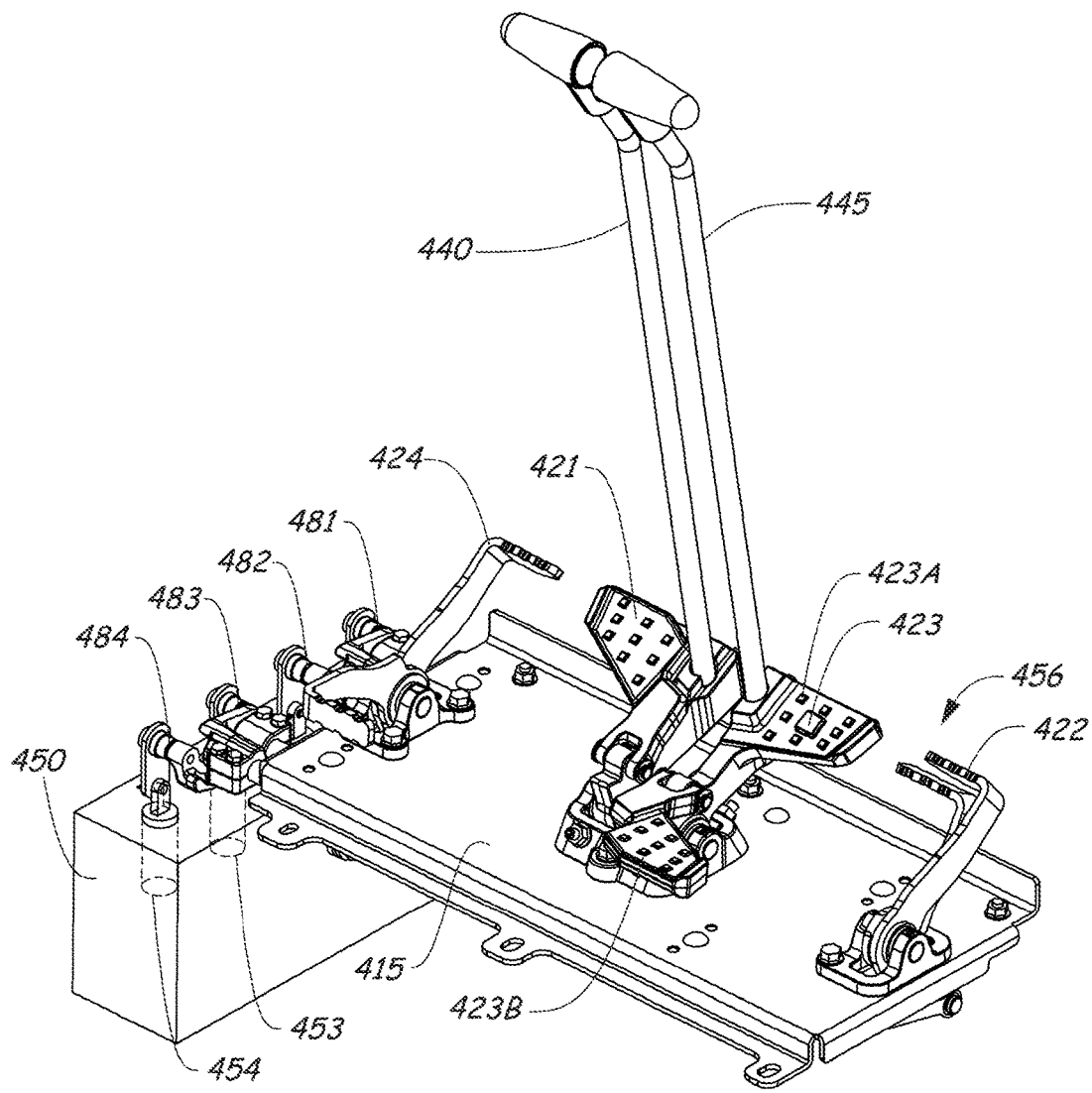
FIG. 4 is a top perspective view of operator input devices, a mechanical linkage, and a hydraulic valve for use in the excavator.
Figure 5:
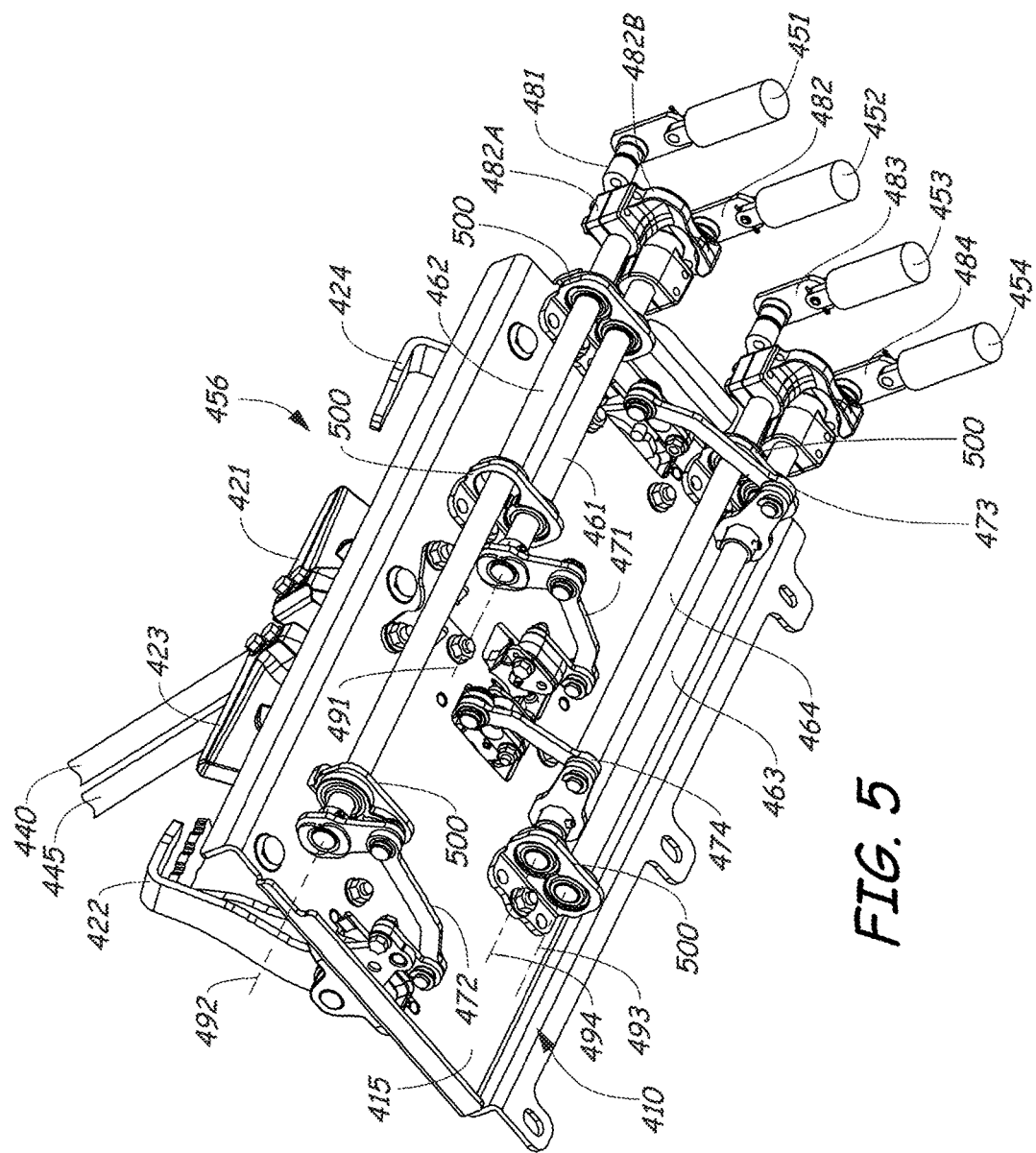
FIG. 5 is a bottom perspective view of the operator input devices, mechanical linkage, and hydraulic valve.

FIGS. 4 and 5 illustrate one embodiment of operator input devices 456 and mechanical linkage 410 for use in a power machine such as power machine 100 and excavator 200 or other types of excavators. The mechanical linkage 410 operably interconnects the operator input devices 456 with a hydraulic valve 450 so that manipulations of the operator input devices 456 can be converted into control signals for operating the hydraulic valve 450. The operator input devices 456 and mechanical linkage 410 are mounted to and supported by a control or mounting plate 415, which in turn is mountable in an operator compartment or at an operator station on an excavator or other power machine in which it is suitable for use. The illustrated operator input devices 456 include a first operator input device 421 (a left pedal in the illustrated embodiment), a second operator input device 422 (an offset control in the illustrated embodiment), a third operator input device 423 (a right pedal in the illustrated embodiment), and a fourth operator input device 424 (an auxiliary control in the illustrated embodiment). The operator input devices 456 can also include optional left and right hand operated controls 440, 445 and any other controls that an operator of the power machine 100 uses to control a work element 130 of the power machine 100. The illustrated left and right hand operated controls 440, 445 can be integrated with the first and third operator input devices 421, 423 when they are installed on the left pedal and right pedal, or may be entirely independent controls for separate work elements 130. Left and right pedals 421 and 423 are foldable pedals, with the left pedal shown in a folded up position and the right pedal 423 shown in a folded down position.

When installed in a power machine, the hydraulic valve 450 is positioned to the side of the operator input devices 456 when mounted in a power machine. Positional and directional terms, such as forward, rearward, to the side, up, down, vertical, horizontal and sideways are used with respect to an ordinary operational position. For example, in the excavator 200 described above, the terms forward and rearward mean in directions toward the respective front and rear of the excavator 200 or, when discussing the orientation of components in the upper frame relative to the position of the operator in the operator compartment, regardless of the rotational orientation of the upper frame relative to the lower frame. The term sideways and to the side mean in a direction perpendicular to the forward and rearward directions, with a left side being to the operator's left and a right being to the operator's right when the operator is in an operating position. As noted above, the main hydraulic valve 450 is to the side of the operator input devices 456, which means that a common sideways-extending vertical plane intersects the main hydraulic valve 450 and the operator input devices 456.

The main hydraulic valve 450 includes a first spool 451, a second spool 452, a third spool 453, and a fourth spool 454, arranged in order from the rear of the main hydraulic valve to the front of the main hydraulic valve 450. The main hydraulic valve 450 is vertically oriented, which means that the spools 451, 452, 453, 454 move up and down (i.e., vertically) to control the direction and amount of hydraulic fluid flowing through the main hydraulic valve 450. The mechanical linkage 410 converts actuation of the operator input devices 456 into vertical actuation of the spools 451, 452, 453, 454 in the main hydraulic valve 450.

The spools 451, 452, 453, 454 provide a flow of hydraulic fluid to the work elements 130 of the power machine 100. The spools 451, 452, 453, and 454 can, in various embodiments, be used to control any of a number of different work elements as may be desired. In the illustrated configuration, the spool valves are configured as follows. The first spool 451 selectively controls hydraulic fluid flow to a drive motor (e.g., the hydraulic motor 247 illustrated in FIG. 2) for a first work element 130 which is a tractive element 140 on the left side of the power machine 100, such as the left track assembly 240A illustrated in FIG. 2. The second spool 452 selectively controls hydraulic fluid flow to a second work element 130, such as the swing actuator 233A illustrated in FIG. 2. The third spool 453 selectively controls hydraulic fluid flow to a third work element 130 which is a tractive element 140 on the right side of the power machine 100, such as the right track assembly 240B illustrated in FIG. 2. The fourth spool 454 selectively controls hydraulic fluid flow to a fourth work element 130, such as the lower lift arm actuator 332 illustrated in FIG. 2. The hydraulic valve 450 gives flow priority to the spools from the first spool 451, then to the second spool 452, then to the third spool 453, and finally to the fourth spool 454. The positions of the particular operator input devices 456 intended to operate the various spools of hydraulic valve 450 are not physically aligned with the spools. The mechanical linkage 410 advantageously provides a mechanical communication between the respective operator inputs and the valve spools to which they intended to be coupled, thereby allowing the hydraulic valve 450 to be positioned to the side of the mounting plate 415.

The mechanical linkage 410 includes four sets of similar components. The components are: first, second, third, and fourth shafts 461, 462, 463, 464; first, second, third, and fourth links 471, 472, 473, 474; and first, second, third, and fourth valve actuators 481, 482, 483, 484. Thus, the first set of components includes the first shaft 461, first link 471, and first valve actuator 481, the second set of components includes the second shaft 462, second link 472, and second valve actuator 482, and so on.

The shafts 461, 462, 463, 464 extend along respective first, second, third, and fourth axes 491, 492, 493, 494. The shafts 461, 462, 463, 464 are supported by bearings 500 that are mounted to the bottom of the mounting plate 415. The shafts 461, 462, 463, 464 rotate in the bearings 500 about the axes 491, 492, 493, 494. The shafts 461, 462, 463, 464 are horizontal and extend sideways. The axes 491, 492, 493, 494 are parallel to and non-collinear with each other.

The first, second, third, and fourth links 471, 472, 473, 474 operably interconnect the respective first, second, third, and fourth shafts 461, 462, 463, 464 with the respective first, second, third, and fourth operator input devices 421, 422, 423, 424. The first, second, third, and fourth valve actuators 481, 482, 483, 484 interconnect a distal, cantilevered end (i.e., opposite the links 471, 472, 473, 474) of the respective first, second, third, and fourth shafts 461, 462, 463, 464 with the respective first, second, third, and fourth spools 451, 452, 453, 454. The valve actuators 481, 482, 483, 484 are fixed or coupled to the shafts 461, 462, 463, 464 for rotation with the shafts, such that rotation of the shafts 461, 462, 463, 464 causes pivoting of the valve actuators 481, 482, 483, 484.

Figure 6:
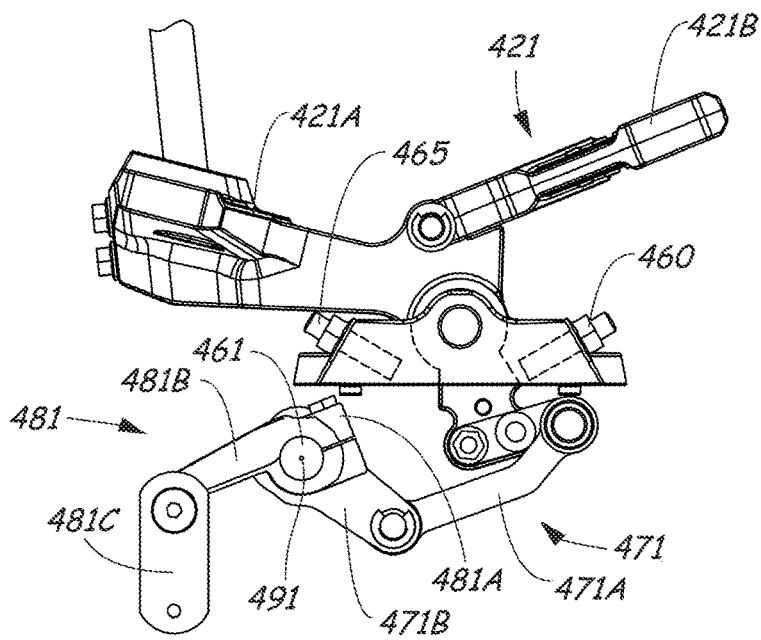
FIG. 6 is an end view of a first set of components of the mechanical linkage in a first actuated position.
Figure 7:
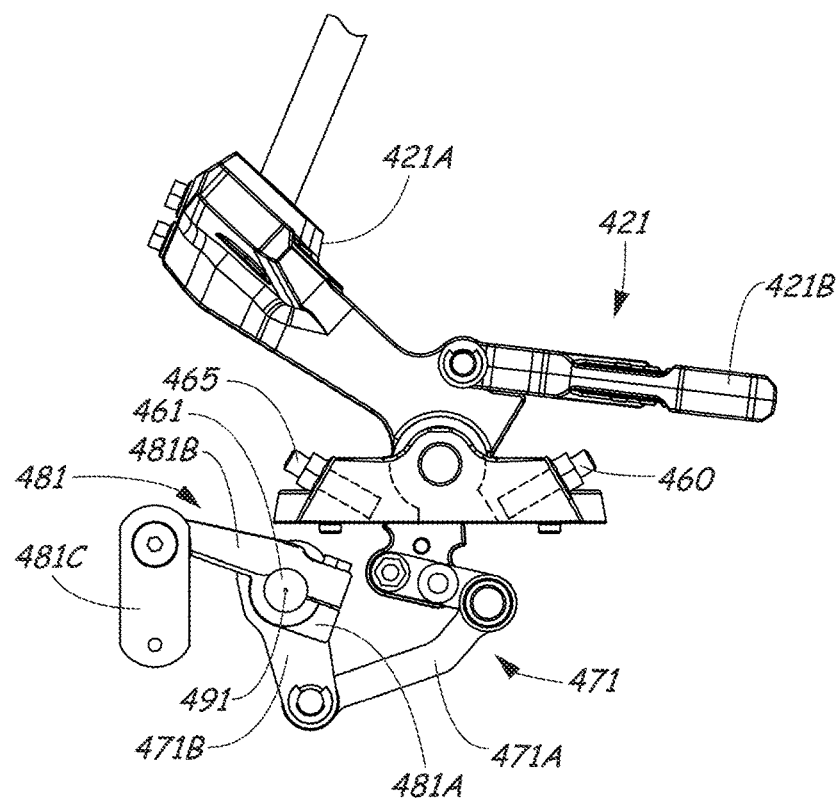
FIG. 7 is an end view of a first set of components of the mechanical linkage in a second actuated position.

FIGS. 6 and 7 illustrate the first set of components (i.e., the first shaft 461, the first link 471, and the first valve actuator 481), which interconnect the first operator input device 421 to the first spool 451. FIG. 6 illustrates the set of components at a first actuated position at an end of its range of motion (in which the first spool 451 is lowered) and FIG. 7 illustrates the set of components at a second actuated position at a second end of its range of motion (in which the first spool 451 is raised). The first set of components is representative of the other three sets of components, and the following description applies to all four sets of components and their interactions with the respective operator input devices and spools.

The first operator input device 421 includes a forward portion 421A and a reverse portion 421B. The forward portion 421A may be operated by the toe of the operator's foot and the reverse portion 412B may be operated by the heel of the operator's foot. As will be explained below, pivoting of the first operator input device 421 in the direction of the forward portion 421A (i.e., the counterclockwise direction in FIGS. 6 and 7) by pressing with a foot on the forward portion 421A causes the tractive element 140 (specifically, the left track assembly 240A) to move the power machine 100 in the forward direction. Pivoting of the first operator input device 421 in the direction of the reverse portion 421B (i.e., the clockwise direction in FIGS. 6 and 7) by pressing with a foot on the reverse portion 421B causes the tractive element 140 to operate in the reverse direction. Adjustable range limiters 460, 465 provide a physical stop for rotation of the first operator input device 421 in the forward and reverse directions. The third operator input device 423 has forward and reverse portions 423A, 423B (FIG. 4) similar to those of the first operator input device 423. Similar range limiters can be provided for the second, third, and fourth operator input devices 422, 423, and 424.

If the operator wishes to control forward and reverse operation of the power machine 100 by hand, the operator can connect the left hand control 440 to the first operator input device 421 and push the left hand control 440 forward for forward operation of the tractive element 140 and rearward for reverse operation. The left hand control 440 connects to the forward portion 421A of the first operator input device 421, and the reverse portion 421B is not required. If the operator desires more foot space in the operator station 150, the operator may pivot or flip the reverse portion 421B up onto the forward portion 421A as illustrated in FIG. 4. The reverse portion 423B of the third operator input device 423 can be likewise flipped up.

The first link 471 includes first and second portions 471A, 471B. The first portion 471A is pivotably connected (e.g., pinned) at one end to the first operator input device 421 and pivotably connected (e.g., pinned) at the opposite end to an end of the second portion 471B. The opposite end of the second portion 471B is coupled to (i.e., fixed for rotation with) the first shaft 461, such that pivoting of the second portion 471B about the first axis 491 applies torque to the first shaft 461 to rotate the first shaft 461 about the first axis 491. Actuation of the first operator input device 421 causes generally upward or downward motion of the first portion 471A, which causes clockwise or counterclockwise rotation of the second portion 471B about the first axis 491 and rotation of the first shaft 461.

The first valve actuator 481 includes a split base 481A that fits around the first shaft 461. The split base 481A is tightened onto the first shaft 461 with fasteners that draw the split base 481A together. When tightened onto the first shaft 461, the split base 481A couples (i.e., fixes for rotation) the first valve actuator 481 and first shaft 461. The first valve actuator 481 further includes an arm 481B extending away from the split base 481A and generally perpendicular to the first axis 491. The first valve actuator 481 also includes a spool connector 481C that is pinned to the arm 481B and hangs or extends down from the arm 481B. The spool connector 481C is connected or connectable to the first spool 451.

When the first shaft 461 rotates about the first axis 491 in response to actuation of the first operator input device 421, the first valve actuator 481 also rotates about the first axis 491. Rotation of the first valve actuator 481 about the first axis 491 causes the arm 481B to lift or lower the spool connector 481C, which causes vertical actuation of the first spool 451. To summarize, the first link 471 converts actuation of the first operator input device 421 into rotation of the first shaft 461, and the first valve actuator 481 converts rotation of the first shaft 461 into linear movement of the first spool 451.

The second valve actuator 482 is similar to or the same as the first valve actuator 481, and includes a split base 482A, an arm 482B, and a spool connector 482C (see FIG. 5). The arms 481B, 482B of the first and second valve actuators 481, 482 cross each other. The first shaft 461 is rearward of the second shaft 462, but because the valve actuators 481, 482 cross each other, the first spool 451 (controlled by the first shaft 461) is forward of the second spool 452 (controlled by the second shaft 462). The arms 481B, 482B of the first and second valve actuators 481, 482 are nested, which means that one arm 481B extends over the other arm 482B and the arms 481B, 482B are curved or otherwise shaped to provide actuating space for each other. Nesting the first and second valve actuators 481, 482 conserves space and provides a compact arrangement of actuators above the main hydraulic control valve 450, so that the first and second spools 451, 452 can be positioned close to each other. The third and fourth valve actuators 483, 484 have the same configuration as the first and second valve actuators 481, 482 and are nested in the same way.

In operation, an operator pivots the first or third operator input devices 421, 423 forward or rearward by pressing on the respective forward portion 421A, 423A and reverse portion 421B, 423B of the operator input devices 421, 423. Forward pivoting of the first operator input device 421 or second operator input device 422 actuates the respective first or third spools 451, 453 through the respective first or third links 471, 473, horizontal shafts 461, 463, and valve actuators 481, 483, to deliver a desired flow rate of hydraulic fluid in a forward direction to the left or right side drive motor and track assemblies. Operation of the left side drive motor drives rotation of the left side track and operation of the right side drive motor drives rotation of the right side track. Rearward pivoting of the first operator input device or third operator input device causes the respective left or right side motor to drive rotation of the respective left or right side track in reverse. The reverse portions 421B, 432B of the first and third operator input devices 421, 423 can be flipped down for foot engagement or flipped up (see left-hand pedal in FIG. 4) to provide more foot room when the operator desires to control the forward and rearward movement of the power machine 100 with the hand controls 440, 445.

Actuation of the second operator input device 422 actuates the second spool 452 through the second link 472, second shaft 462, and second valve actuator 482, to deliver hydraulic fluid flow to the swing actuator 233A to control the offset setting of the boom 232. Actuation of the fourth operator input device 424 actuates the fourth spool 454 through the fourth link 474, fourth shaft 464, and fourth valve actuator 484, to deliver hydraulic fluid to an auxiliary device.

Although the present invention has been described with reference to preferred embodiments, workers skilled in the art will recognize that changes may be made in form and detail without departing from the scope of the discussion.

What is claimed is:

1. A mechanical linkage for a power machine having a forward end and a rearward end, a sideways direction being generally perpendicular to an axis that extends between the forward and rearward end, the power machine including a hydraulic spool valve, the linkage comprising:
   a first horizontal shaft extending sideways along a first axis;
   a first link operably coupled to the first horizontal shaft and configured to be operably coupled to a first operator input device and for converting actuation of the first operator input device into rotation of the first horizontal shaft about the first axis;
   a first valve actuator connectable to a first spool in the hydraulic spool valve for converting rotation of the first horizontal shaft about the first axis into actuation of the first spool;
   a second horizontal shaft positioned rearward of the first horizontal shaft and extending sideways along a second axis that is parallel to and non-collinear with the first axis;
   a second link operably coupled to the second horizontal shaft and configured to be operably coupled to a second operator input device and for converting actuation of the second operator input device into rotation of the second horizontal shaft about the second axis; and
   a second valve actuator connectable to a second spool that is positioned forward of and is generally parallel with the first spool in the hydraulic spool valve for converting rotation of the second horizontal shaft about the second axis into actuation of the second spool.

2. The mechanical linkage of claim 1, wherein:
   the first valve actuator extends rearward;
   the second valve actuator extends forward; and
   the first valve actuator and second valve actuator cross each other.

3. The mechanical linkage of claim 1, wherein the first valve actuator and the second valve actuator are nested.

4. The mechanical linkage of claim 1, further comprising:
   a third horizontal shaft extending sideways along a third axis that is parallel to and non-collinear with the first axis;
   a third link operably coupled to the third horizontal shaft and configured to be operably coupled to a third operator input device and for converting actuation of the third operator input device into rotation of the third horizontal shaft about the third axis;
   a third valve actuator for converting rotation of the third horizontal shaft about the third axis into actuation of a third spool in the hydraulic spool valve;
   a fourth horizontal shaft extending sideways along a fourth axis that is parallel to and non-collinear with the first axis;
   a fourth link operably coupled to the fourth horizontal shaft and configured to be operably coupled to a fourth operator input device and for converting actuation of the fourth operator input device into rotation of the fourth horizontal shaft about the fourth axis; and
   a fourth valve actuator for converting rotation of the fourth horizontal shaft about the fourth axis into actuation of a fourth spool in the hydraulic spool valve.

5. The mechanical linkage of claim 4, wherein the third horizontal shaft is parallel to and non-collinear with the second axis; and the fourth horizontal shaft is parallel to and non-collinear with both the second axis and the third axis.

6. The mechanical linkage of claim 4, wherein:
the third horizontal shaft is forward of the fourth horizontal shaft;
the third valve actuator extends rearward;
the fourth valve actuator extends forward; and
the third valve actuator and fourth valve actuator cross each other.

7. The mechanical linkage of claim 4, wherein the third valve actuator and the fourth valve actuator are nested.

8. A power machine having front and rear ends, forward and rearward directions being toward the respective front and rear ends, and a sideways direction being generally perpendicular to the forward and rearward directions, the power machine comprising:
a hydraulic spool valve having first and second spools the first spool being positioned rearward of the second spool;
a first operator input device;
a first horizontal shaft extending sideways along a first axis;
a first link interconnecting the first operator input device and the first horizontal shaft for converting actuation of the first operator input device into rotation of the first horizontal shaft about the first axis;
a first valve actuator for converting rotation of the first horizontal shaft about the first axis into actuation of the first spool;
a second operator input device;
a second horizontal shaft extending sideways along a second axis that is parallel to, non-collinear with, and rearward of the first axis;
a second link interconnecting the second operator input device and the second horizontal shaft for converting actuation of the second operator input device into rotation of the second horizontal shaft about the second axis, the second link being parallel to the first link; and
a second valve actuator for converting rotation of the second horizontal shaft about the second axis into actuation of the second spool.

9. The power machine of claim 8, wherein:
the first valve actuator extends rearward;
the second valve actuator extends forward; and
the first valve actuator and second valve actuator cross each other.

10. The power machine of claim 8, wherein the first valve actuator and the second valve actuator are nested.

11. The power machine of claim 8, wherein the first operator input device controls a hydraulic drive motor and the second operator input device controls a boom offset.

12. The power machine of claim 8, wherein the first and second spools are arranged and actuated vertically.

13. The power machine of claim 8, wherein the hydraulic spool valve is positioned to a side of the first and second input devices, such that each of the first input device, second input device, and hydraulic spool valve is intersected by a common sideways-extending vertical plane.

14. The power machine of claim 8, wherein the hydraulic spool valve includes third and fourth spools, the power machine further comprising:
a third operator input device;
a third horizontal shaft extending sideways along a third axis;
a third link interconnecting the third operator input device and the third horizontal shaft for converting actuation of the third operator input device into rotation of the third horizontal shaft about the third axis;
a third valve actuator for converting rotation of the third horizontal shaft about the third axis into actuation of the third spool;
a fourth operator input device;
a fourth horizontal shaft extending sideways along a fourth axis that is parallel to and non-collinear with the first axis;
a fourth link interconnecting the fourth operator input device and the fourth horizontal shaft for converting actuation of the fourth operator input device into rotation of the fourth horizontal shaft about the fourth axis; and
a fourth valve actuator for converting rotation of the fourth horizontal shaft about the fourth axis into actuation of the fourth spool.

15. The power machine of claim 14, wherein the third horizontal shaft is parallel to and non-collinear with the second axis; and the fourth horizontal shaft is parallel to and non-collinear with both the second axis and the third axis.

16. The power machine of claim 14, wherein the first operator input device controls a first hydraulic drive motor of the power machine; the second operator input device controls a boom offset of the power machine; the third operator input device controls a second hydraulic drive motor of the power machine; and the fourth operator input device controls an auxiliary hydraulic implement of the power machine.

17. The mechanical linkage of claim 1, wherein the first valve actuator is disposed at an end of the first horizontal shaft, and wherein the second valve actuator is disposed at an end of the second horizontal shaft.

18. The power machine of claim 8, wherein the first valve actuator is disposed at an end of the first horizontal shaft, and wherein the second valve actuator is disposed at an end of the second horizontal shaft.

19. The power machine of claim 8, further comprising a left side and a right side extending between the front and rear ends, wherein the first spool and the second spool are located proximate one of the left side or the right side.

* * * * *